US012671012B2

United States Patent
(12) United States Patent
Noma

(10) Patent No.: US 12,671,012 B2
(45) Date of Patent: Jun. 30, 2026

(54) POWER SUPPLY FACILITY

(71) Applicant: Daifuku Co., Ltd., Osaka (JP)

(72) Inventor: Kousei Noma, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 170 days.

(21) Appl. No.: 18/438,568

(22) Filed: Feb. 12, 2024

(65) Prior Publication Data

US 2024/0274322 A1 Aug. 15, 2024

(30) Foreign Application Priority Data

Feb. 13, 2023 (JP) ................................ 2023-020227

(51) Int. Cl.
*H01B 7/32* (2006.01)
*H01B 7/02* (2006.01)
*H01B 9/00* (2006.01)

(52) U.S. Cl.
CPC ............... *H01B 7/324* (2013.01); *H01B 7/02* (2013.01); *H01B 9/00* (2013.01)

(58) Field of Classification Search
None
See application file for complete search history.

(56) References Cited

U.S. PATENT DOCUMENTS 6,335,853 B1 1/2002 Kitagawa et al.
2006/0054334 A1* 3/2006 Vaupotic ............ H01B 11/1008 174/106 R
2009/0014210 A1* 1/2009 Forbis ...................... H02G 3/32 361/825
2013/0314889 A1* 11/2013 Grimm ................ H01R 13/447 361/823
2020/0264052 A1* 8/2020 Taira ........................ G01K 1/08
2022/0068521 A1* 3/2022 Huang ................... H01B 7/292
2023/0245800 A1* 8/2023 Moriyama ............. H01B 7/292 174/110 R
2023/0253778 A1* 8/2023 Yamamoto ............. G01R 31/52 361/93.1

FOREIGN PATENT DOCUMENTS

JP 10201006 A 7/1998
KR 102042455 B1 * 11/2019 ............. H01F 38/14

* cited by examiner

*Primary Examiner* — Krystal Robinson
(74) *Attorney, Agent, or Firm* — The Webb Law Firm

(57) ABSTRACT

A power supply facility includes a feeder cable disposed along a moving path of a movable body and configured to contactlessly supply electric power to the movable body, and a heat sensitive unit disposed along the moving path together with the feeder cable. The feeder cable includes a conductor bundle bundling up a plurality of conductor lines through which an alternating-current flows, and an insulating coating covering the conductor bundle. The heat sensitive unit includes a first heat sensitive wire contained inside the insulating coating of the feeder cable and extending along an extending direction of the feeder cable together with the conductor bundle; and a second heat sensitive wire disposed at a position next to the feeder cable and extending along the extending direction of the feeder cable together with the feeder cable.

7 Claims, 6 Drawing Sheets

POWER SUPPLY FACILITY

CROSS-REFERENCE TO RELATED APPLICATION

This application claims priority to Japanese Patent Application No. 2023-020227 filed Feb. 13, 2023, the disclosure of which is hereby incorporated by reference in its entirety.

BACKGROUND OF THE INVENTION

1. Field of the Invention

The present invention relates to a power supply facility including a feeder cable disposed along a moving path of a movable body and configured to contactlessly supply electric power to the movable body, and a heat sensitive unit disposed along the moving path together with the feeder cable.

2. Description of Related Art

For example, Japanese Unexamined Patent Application Publication No. 10-201006 (Patent Literature 1) discloses a technology about such a power supply facility. Hereinafter, reference signs described within parentheses in Description of the Related Art are reference signs used in Patent Literature 1.

A power supply facility (a contactless power supply facility) of Patent Literature 1 includes a feeder cable (a guide wire path 14) disposed along a travel path of a movable body (a transport vehicle body V), and a heat sensitive wire (15) disposed along the travel path together with the feeder cable. The feeder cable contactlessly supplies electric power to the movable body. Further, when the surrounding temperature around the heat sensitive wire (15) reaches a given temperature, an insulating material (18) inside the heat sensitive wire (15) softens and makes contact with a pair of twisted conducting wires (17) to cause a short-circuit. When the heat sensitive wire (15) short-circuits, power supply to the feeder cable is stopped.

In the power supply facility as described in Patent Literature 1, the occurrence of abnormal heat generation in the feeder cable or around the feeder cable is considered as a factor to cause a short-circuit in the heat sensitive wire. Here, the factor of abnormal heat generation in the feeder cable may be, for example, a temperature rise in the feeder cable due to excess current or short-circuit caused by overload of a power supply apparatus. In this case, some kind of problem is more likely to occur in the power supply facility. Further, the factor of abnormal heat generation around the feeder cable may be, for example, a temperature rise in metal present around the feeder cable under the influence of a magnetic field caused around the feeder cable. This can be caused in a case where an operator leaves a metal tool around the feeder cable by mistake, for example. In any case, when abnormal heat generation in the feeder cable or around the feeder cable is detected, it is preferable to quickly specify a place where the problem occurs and to immediately respond appropriately. However, in the power supply facility, the heat sensitive wire is disposed along the extending direction of the feeder cable to make contact with the outer peripheral surface of the feeder cable. In such an arrangement of the heat sensitive wire, when abnormal heat generation is detected by the heat sensitive wire, it is difficult to specify whether the abnormal heat generation occurs due to the temperature rise of the feeder cable or the temperature rise around the feeder cable, and therefore, it might take time to specify the place where the problem occurs.

SUMMARY OF THE INVENTION

In view of the foregoing, a power supply facility that can easily and quickly specify a place of the occurrence of a problem caused in or around a feeder cable.

A power supply facility according to this disclosure is a power supply facility including: a feeder cable disposed along a moving path of a movable body and configured to contactlessly supply electric power to the movable body; and a heat sensitive unit disposed along the moving path together with the feeder cable. The feeder cable includes a conductor bundle bundling up a plurality of conductor lines through which an alternating-current flows, and an insulating coating covering the conductor bundle. The heat sensitive unit includes: a first heat sensitive wire contained inside the insulating coating of the feeder cable and extending along an extending direction of the feeder cable together with the conductor bundle; and a second heat sensitive wire disposed at a position next to the feeder cable and extending along the extending direction of the feeder cable together with the feeder cable.

With this configuration, in a case where the first heat sensitive wire detects abnormal heat generation, and the second heat sensitive wire detects no abnormal heat generation, it can be estimated that a problem is more likely to occur inside the feeder cable, and in a case where the second heat sensitive wire detects abnormal heat generation, and the first heat sensitive wire detects no abnormal heat generation, it can be estimated that a problem is more likely to occur outside the feeder cable. Further, in a case where both the first heat sensitive wire and the second heat sensitive wire detect abnormal heat generation, it can be estimated that a relatively large problem is more likely to occur in or around the feeder cable.

As such, with this configuration, by referring to detection results from the first heat sensitive wire and the second heat sensitive wire, a place where a problem occurs in or around the feeder cable can be easily quickly specified.

Further features and advantages of the power supply facility are made clear from the following description on exemplary and nonlimiting embodiments to be described with reference to the drawings.

DESCRIPTION OF THE INVENTION

Figure 1:
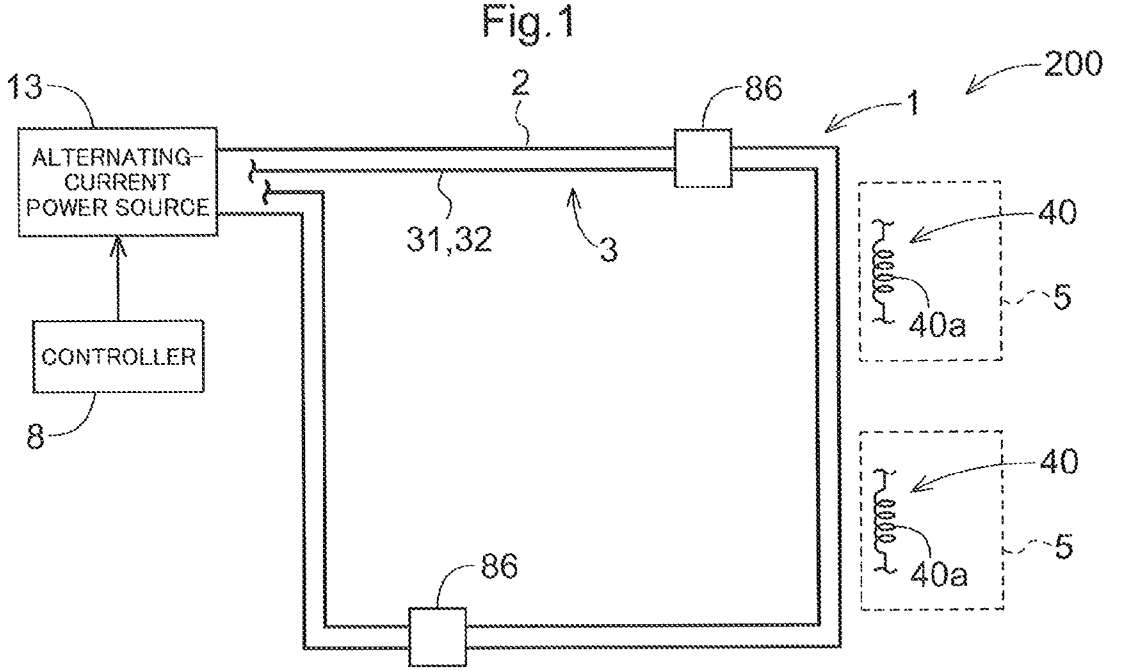
FIG. 1 is a plan view of a whole article transport facility including a power supply facility.
Figure 2:
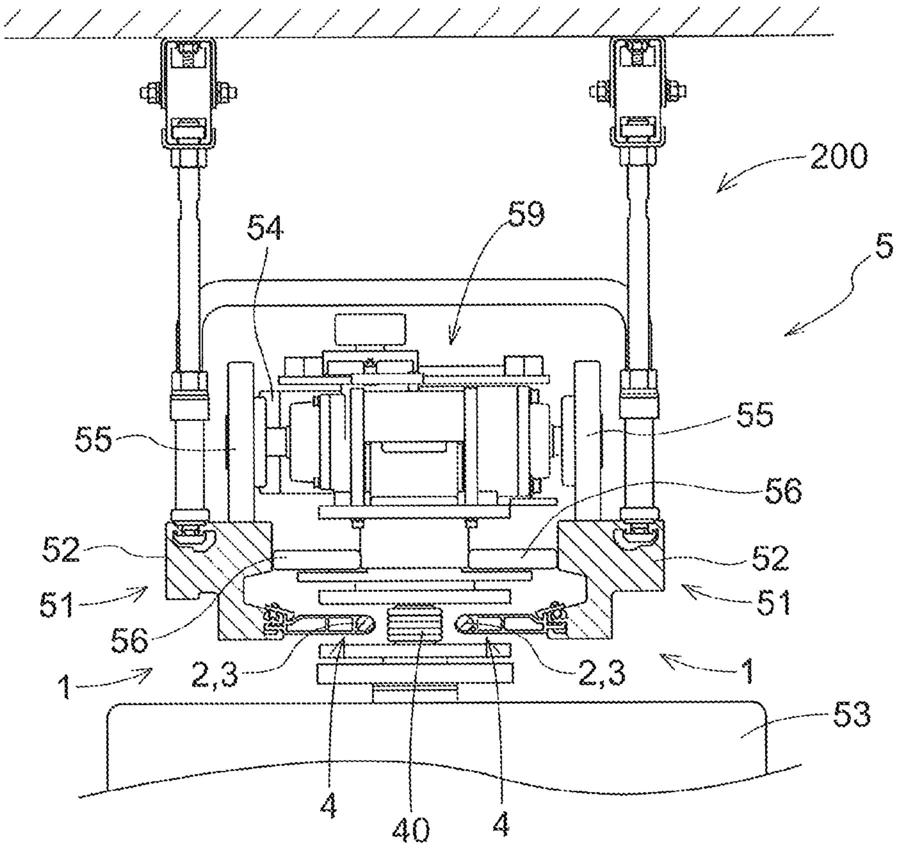
FIG. 2 is a front view of a movable body.

The following describes an embodiment of a power supply facility based on the drawings with reference to, as an example, a form in which electric power is supplied to an article transport vehicle in an article transport facility. As illustrated in FIGS. 1, 2, a movable body 5 as an article transport vehicle in an article transport facility 200 travels on traveling rails 52 disposed along a moving path 51 as a travel path. As illustrated in FIG. 1, the power supply facility 1 includes a feeder cable 2 disposed along the moving path 51 of the movable body 5 and configured to contactlessly supply electric power to the movable body 5, and a heat sensitive unit 3 disposed along the moving path 51 together with the feeder cable 2.

As illustrated in FIG. 2, the movable body 5 includes a travel section 59 guided by a pair of traveling rails 52 to travel along the moving path 51, the pair of traveling rails 52 being disposed to be suspended from the ceiling and supported, a transport vehicle body 53 disposed below the traveling rails 52 to be suspended and supported by the travel section 59, and a power reception device 40 configured to contactlessly receive driving electric power from the feeder cable 2 disposed along the moving path 51. The transport vehicle body 53 includes an article support section (not illustrated) provided elevatably in the transport vehicle body 53 and configured to support an article such that the article is hung from the article support section. The article as a transport target to be transported by the movable body 5 is, for example, a FOUP (Front Opening Unified Pod) for storing semiconductor substrates, a glass substrate as a material for a display, and the like.

As illustrated in FIG. 2, the travel section 59 includes a pair of running wheels 55 driven to rotate by an electric drive motor 54. The running wheels 55 roll on respective travel faces formed by respective upper surfaces of the traveling rails 52. Further, the travel section 59 includes a pair of guide wheels 56 freely rotatable around their axes (around vertical axes) along the up-down direction such that the pair of guide wheels 56 abut with respective inner surfaces of the pair of traveling rails 52. Further, the travel section 59 includes the drive motor 54 for travel, its driving circuit, and so on and drives the movable body 5 to travel along the traveling rails 52. The transport vehicle body 53 includes an actuator configured to lift and lower an article support section, an actuator configured to drive a gripper for gripping an article, and the like, and driving circuits for them, and so on.

Electric power to the drive motor 54, various actuators, the driving circuits for driving them, and so on is contactlessly supplied from the feeder cable 2 to the power reception device 40. The feeder cable 2 configured to supply driving electric power to the movable body 5 via the power reception device 40 is disposed on either side of the power reception device 40 in a path width direction along a horizontal surface and perpendicular to a direction along the moving path 51 (hereinafter just referred to as a "path width direction"), in the present embodiment.

The power reception device 40 supplies driving electric power to the movable body 5 contactlessly from the feeder cable 2. More specifically, the power reception device 40 applies a high-frequency current to the feeder cable 2 as an induction line to generate a magnetic field around the feeder cable 2. The power reception device 40 includes a pick-up coil 40*a* and a magnetic core, and alternating-current electric power is induced in the pick-up coil 40*a* by electromagnetic induction from the magnetic field. The alternating-current electric power thus induced is converted into direct-current electric power by a power receiving circuit (not illustrated) including a rectifier circuit such as a full-wave rectifier, a smoothing capacitor, or the like and is supplied to the actuators or the driving circuits.

Note that the present specification deals with an article transport vehicle that is a so-called ceiling transport vehicle as the movable body 5. However, naturally, the movable body 5 may be an article transport vehicle traveling on the ground (including an article transport vehicle traveling along a storage section on each level in a storage shelf including storage sections at multiple levels along the up-down direction) or may be a travel wagon of a stacker crane, or the like. The movable body 5 may have any form, provided that the movable body 5 works upon receipt of electric power from the feeder cable 2 disposed along the moving path 51. It is needless to say that the movable body 5 is not limited to an article transport vehicle.

Figure 3:
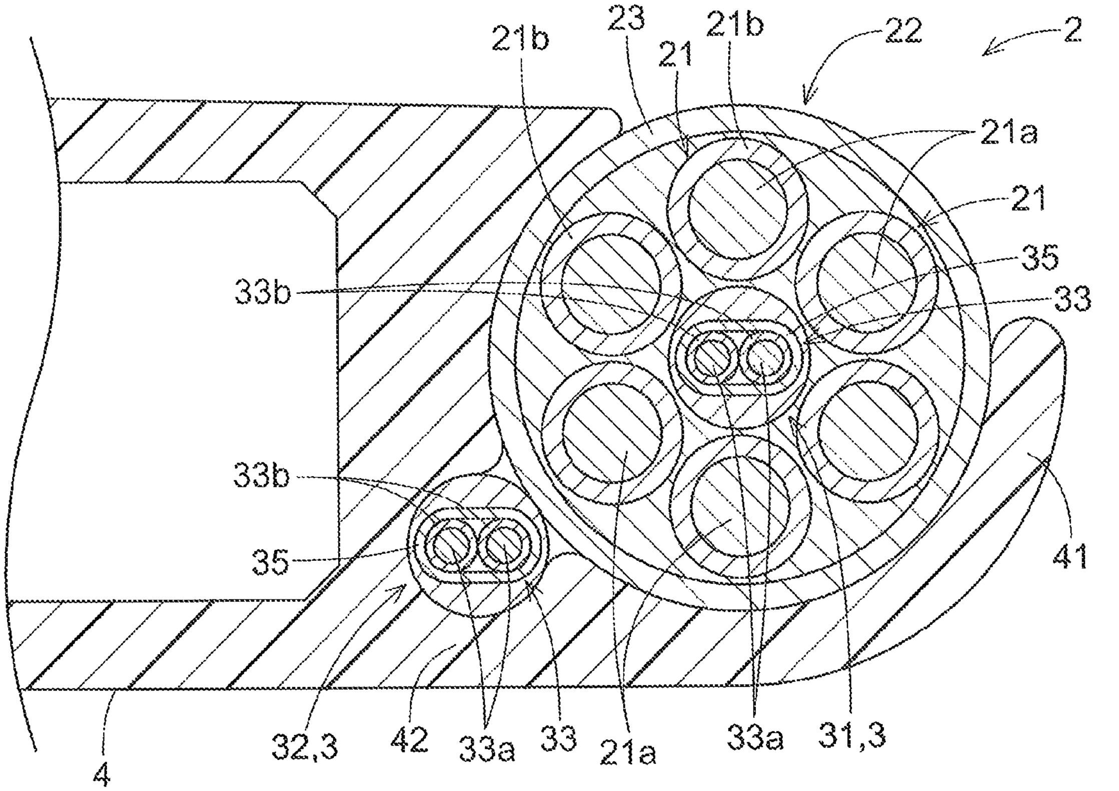
FIG. 3 is a sectional view of a support member, a feeder cable, and a heat sensitive unit.

As illustrated in FIG. 3, the feeder cable 2 includes a conductor bundle 22 bundling up a plurality of conductor lines 21 through which an alternating-current flows, and an insulating coating 23 covering the conductor bundle 22. In the present embodiment, the plurality of conductor lines 21 is induction lines via which electric power is supplied contactlessly. Accordingly, all the conductor lines 21 constituting the conductor bundle 22 in the insulating coating 23 are configured such that a current in the same direction flows therethrough. Here, each of the plurality of conductor lines 21 includes a conductor line body 21*a* (a core wire), and a conductor line coating 21*b* made of an insulating material and covering the conductor line body 21*a*. The arrangement of these conductor lines 21 inside the feeder cable 2 will be described later.

As illustrated from FIGS. 1 to 3, the heat sensitive unit 3 includes a first heat sensitive wire 31 provided inside the insulating coating 23 in the feeder cable 2 and extending along the extending direction of the feeder cable 2 together with the conductor bundle 22, and a second heat sensitive wire 32 disposed at a position next to the feeder cable 2 and extending along the extending direction of the feeder cable 2 together with the feeder cable 2. In the present embodiment, as illustrated in FIG. 1, the first heat sensitive wire 31 is disposed throughout the feeder cable 2 in the power supply facility 1. Further, the second heat sensitive wire 32 is disposed throughout the arrangement region of the feeder cable 2 in the power supply facility 1. In the example of FIG. 1, a plurality of feeder cables 2 is connected to each other via a terminal block 10 (described later) in the power supply facility 1. The first heat sensitive wire 31 and the second heat sensitive wire 32 are disposed along the plurality of feeder cables 2 connected to each other.

As illustrated in FIG. 3, in this example, the first heat sensitive wire 31 and the second heat sensitive wire 32 have the same structure. The first heat sensitive wire 31 includes a pair of conducting wires 33 each covered with a heat-sensitive-wire insulating material 33*b* configured to soften at a preset temperature. One conducting wire 33 is configured as a coating conductor line in which a core wire 33*a* made of an electric conductor is coated with the heat-sensitive-wire insulating material 33*b*. A twisted wire obtained by twisting two conducting wires 33 into a so-called twisted pair is further coated with a heat-sensitive-wire coating material 35, so that the first heat sensitive wire 31 including the pair of conducting wires 33 is formed. The pair of conducting wires 33 is configured such that, when the heat-sensitive-wire insulating materials 33*b* soften, their respective core wires 33*a* made of an electric conductor come into contact with each other and cause a short-circuit. Note that, even if the heat-sensitive-wire insulating materials 33*b* soften, the first heat sensitive wire 31 including the pair of conducting wires 33 is coated with the heat-sensitive-wire coating material 35, so that the core wires 33*a* are prevented from being exposed outside. Since the second heat sensitive wire 32 also has the same configuration as the first heat sensitive wire 31, the descriptions thereof are omitted herein.

As illustrated in FIG. 3, the first heat sensitive wire 31 is disposed in the center of the feeder cable 2 surrounded by the conductor bundle 22. More specifically, the first heat sensitive wire 31 is disposed in the center of the feeder cable 2 to be surrounded by the plurality of conductor lines 21. The insulating coating 23 of the feeder cable 2 is disposed to cover both the conductor bundle 22 constituted by the plurality of conductor lines 21 and the first heat sensitive wire 31. In the example illustrated herein, six conductor lines 21 are collectively disposed as one conductor bundle 22 inside the feeder cable 2. The first heat sensitive wire 31 is disposed to be surrounded by the six conductor lines 21. Further, as illustrated in FIG. 2, the second heat sensitive wire 32 is disposed in contact with the insulating coating 23 of the feeder cable 2. In the present embodiment, as illustrated in FIG. 1, the second heat sensitive wire 32 is disposed on an opposite side of the feeder cable 2 from the power reception device 40 in the path width direction. The heat-sensitive-wire coating material 35 of the second heat sensitive wire 32 is in contact with the insulating coating 23 of the feeder cable 2. In the example of FIG. 1, respective second heat sensitive wires 32 are disposed outwardly in the path width direction from the pair of feeder cables 2 each disposed on each side of the power reception device 40 in the path width direction. Further, the second heat sensitive wire 32 is disposed at a position, in the top-bottom direction, below a center part of the feeder cable 2.

As illustrated in FIGS. 2, 3, the power supply facility 1 further includes a support member 4 disposed along the moving path 51 and supporting the feeder cable 2 and the second heat sensitive wire 32. A plurality of support members 4 is disposed along each of the pair of traveling rails 52 and supports the feeder cable 2 and the second heat sensitive wire 32 from below. As describe above, the feeder cable 2 contains the first heat sensitive wire 31. In view of this, it may be said that the support member 4 supports the first heat sensitive wire 31 and the second heat sensitive wire 32 (i.e., the heat sensitive unit 3) from below. In the example of FIG. 2, the support member 4 is supported by the traveling rail 52 such that the support member 4 is along the path width direction. Further, the support member 4 is disposed between the power reception device 40 and the traveling rail 52. A pair of support members 4 is provided to correspond to the pair of traveling rails 52. A plurality of pairs of support members 4 is provided at given intervals along the moving path 51 of the movable body 5.

As illustrated in FIG. 3, the support member 4 includes a first holder 41 holding the feeder cable 2, and a second holder 42 holding the second heat sensitive wire 32. The first holder 41 and the second holder 42 are provided in an end part (a distal end part) on an inner side (a side where the power reception device 40 is disposed) of the support member 4 in the path width direction. Further, in the present embodiment, the second heat sensitive wire 32 is disposed in the second holder 42, and then, the feeder cable 2 is disposed in the first holder 41, so that the second heat sensitive wire 32 is held by the second holder 42 so as not to fall off. In the present example, the first holder 41 is provided inwardly (on the distal end side) in the path width direction from the second holder 42. Further, the first holder 41 and the second holder 42 are disposed next to each other.

As illustrated in FIG. 3, the first holder 41 is formed in a recessed groove shape within which the feeder cable 2 is fitted. In the example illustrated herein, the distal end part of the support member 4 is partially penetrated in a direction along the moving path 51 and is cut to be opened inwardly in the path width direction and upwardly, so that the first holder 41 having a recessed groove shape is formed. When the feeder cable 2 is pushed in from the opened part of the first holder 41, the feeder cable 2 is fitted within a recessed-groove part of the first holder 41. Further, the second holder 42 has a recessed groove shape in which the second heat sensitive wire 32 is contained and is formed to be opened on an inner surface 41*a* of the first holder 41. In the example illustrated herein, a part of the second holder 42 which part is next to an outer side of the first holder 41 in the path width direction penetrates through the support member 4 in a direction along the moving path 51 and is cut to be opened on the inner surface 41*a* of the first holder 41, so that the second holder 42 having a recessed groove shape is formed. When the second heat sensitive wire 32 is pushed in from a part opened on the inner surface 41*a* of the first holder 41, the second heat sensitive wire 32 is fitted within a recessed-groove part of the second holder 42. Here, when the feeder cable 2 is fitted in the first holder 41 after the second heat sensitive wire 32 is fitted in the second holder 42, the second heat sensitive wire 32 thus fitted is surrounded by the support member 4 (herein, a part constituting the second holder 42) and the feeder cable 2 held by the first holder 41. This avoids the second heat sensitive wire 32 from falling off from the second holder 42. In the example illustrated herein, respective shapes of the first holder 41 and the second holder 42 are formed to fit respective outer circumferential shapes of the feeder cable 2 and the second heat sensitive wire 32. Note that respective sectional shapes of recessed grooves constituting the first holder 41 and the second holder 42 are not limited to curved shapes illustrated in FIG. 3 and may be broken line shapes.

Figure 4:
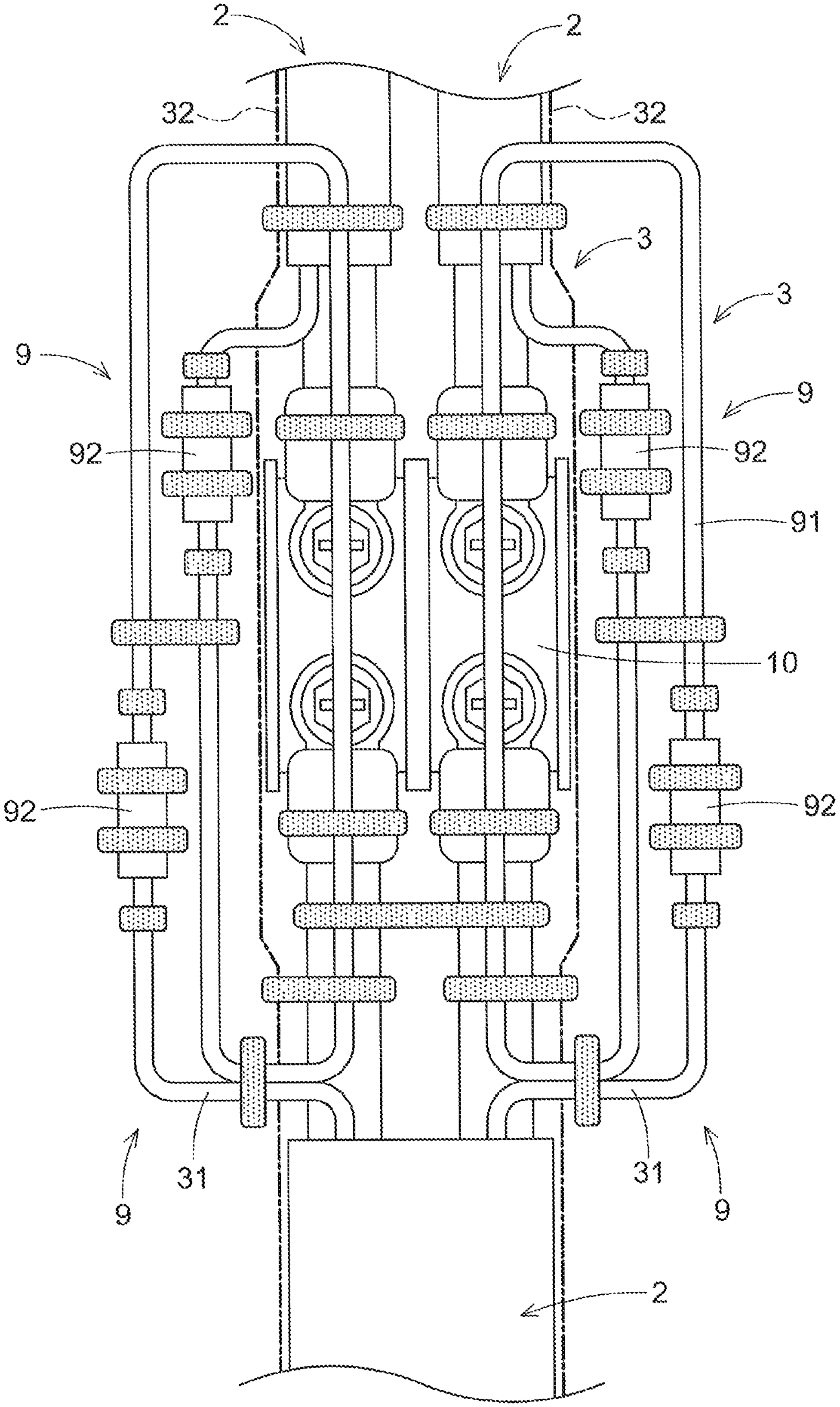
FIG. 4 is a plan view schematically illustrating a terminal block and a terminal block corresponding part.

In a case where the article transport facility 200 has a large dimension, naturally, the power supply facility 1 also has a large dimension, and therefore, a plurality of feeder cables 2 can be connected to each other for use, for example. Further, the feeder cable 2 can be also used in such a manner as to be connected to a wire of a control board or the like. In such a case, in the present embodiment, as illustrated in FIGS. 1, 4, a plurality of feeder cables 2 is electrically connected to each other via the terminal block 10. As illustrated in FIG. 4, in the power supply facility 1, a target heat sensitive wire 9 that is at least one of the first heat sensitive wire 31 and the second heat sensitive wire 32 includes a terminal block corresponding part 91 disposed in contact with the terminal block 10. In the present example, the first heat sensitive wire 31 includes the terminal block corresponding part 91. That is, in the present example, the target heat sensitive wire 9 is the first heat sensitive wire 31. Here, the terminal block corresponding part 91 is detachably connected, via a connector 92, to a part of the target heat sensitive wire 9 which part is along the insulating coating 23 of the feeder cable 2. In the present example, the terminal block corresponding part 91 is detachably connected, via the connector 92, to a part of the first heat sensitive wire 31 which part is inside the insulating coating 23 of the feeder cable 2.

As illustrated in FIG. 4, the terminal block corresponding part 91 of the first heat sensitive wire 31 is formed independently to correspond to one terminal block 10. The terminal block corresponding part 91 electrically connect, via connectors 92, respective first heat sensitive wires 31 contained in a plurality of feeder cables 2 electrically connected to each other via the terminal block 10. The terminal block corresponding part 91 has the same structure as the first heat sensitive wire 31. In the example of FIG. 4, the arrangement of the terminal block corresponding part 91 in the terminal block 10 is illustrated schematically. In this example, a plurality of (herein, two) terminal block corresponding parts 91 is disposed along a metal part of the terminal block 10 and its surroundings. In the example illustrated herein, two feeder cables 2 are disposed on each side of the terminal block 10. Each terminal block corresponding part 91 connects the first heat sensitive wires 31 facing each other across the terminal block 10 to each other (that is, the first heat sensitive wires 31 contained in the feeder cables 2). More specifically, an unwrapped end part, of the first heat sensitive wire 31, that is pulled off from one of the feeder cables 2 facing each other is connected to one end part of the terminal block corresponding part 91 via one connector 92. Further, an unwrapped end part, of the first heat sensitive wire 31, that is pulled off from the other one of the feeder cables 2 facing each other and connected to the one of the feeder cables 2 via the terminal block 10 is connected to the other end part of the terminal block corresponding part 91 via another connector 92. Two terminal block corresponding parts 91 are separated from each other in the path width direction and are disposed along the metal part of the terminal block 10 and its surroundings. When the terminal block corresponding parts 91 are provided as such, it is possible to detect abnormal heat generation in or around the terminal block 10.

Note that, in a case where the terminal block corresponding part 91 is disposed in the terminal block 10, the terminal block corresponding part 91 may be tied to the terminal block 10 by use of a zip tie or the like. In such a case, the terminal block corresponding part 91 of the first heat sensitive wire 31 is supported by the terminal block 10, and the other part (herein, a part inside the insulating coating 23 of the feeder cable 2) is supported by the support member 4 via the feeder cable 2. Further, FIG. 4 schematically illustrates the arrangement of the second heat sensitive wire 32 (an alternate long and short dash line in FIG. 4). The second heat sensitive wire 32 is supported by the support member 4 and disposed along the moving path 51, independently of the terminal block 10.

Figure 5:
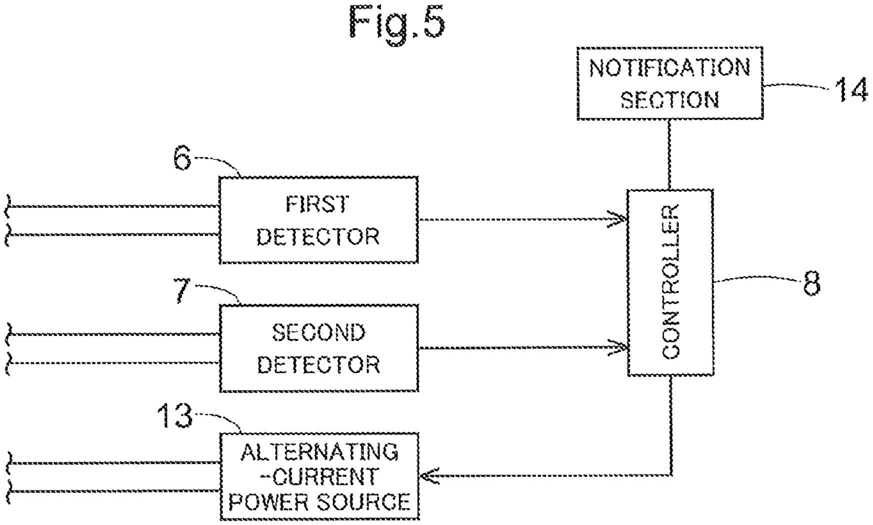
FIG. 5 is a control block diagram.

As illustrated in FIGS. 1, 5, the power supply facility 1 includes a first detector 6 configured to detect abnormal heat generation from the first heat sensitive wire 31, a second detector 7 configured to detect abnormal heat generation from the second heat sensitive wire 32, and a controller 8 configured to control an alternating-current power source 13 for supplying electric power to the feeder cable 2. Further, the power supply facility 1 further includes a notification section 14.

The first detector 6 can detect an abnormality (temperature rise) in the feeder cable 2 by detecting the occurrence of a short-circuit in the first heat sensitive wire 31 while a current is applied to the first heat sensitive wire 31. Further, the second detector 7 can detect an abnormality (temperature rise) in the feeder cable 2 and around the feeder cable 2 by detecting the occurrence of a short-circuit in the second heat sensitive wire 32 while a current is applied to the second heat sensitive wire 32. Note that, although not illustrated herein, the power supply facility 1 includes a power source for supplying electric power to the first heat sensitive wire 31 and the second heat sensitive wire 32. The power source may be a single power source corresponding to both the first heat sensitive wire 31 and the second heat sensitive wire 32. Alternatively, a plurality of power sources corresponding to the first heat sensitive wire 31 and the second heat sensitive wire 32, respectively, may be provided.

The controller 8 performs an abnormality control on the alternating-current power source 13 and the notification section 14 based on detection results from the first detector 6 and the second detector 7. The controller 8 may be provided in a control device (not illustrated) provided in the article transport facility 200 and configured to perform a travel control on the movable body 5, or the like, or may be a control device provided in the power supply facility 1. In the present embodiment, in response to either of the first detector 6 and the second detector 7 detecting abnormal heat generation, the controller 8 outputs a warning, and in response to the first detector 6 and the second detector 7 both detecting abnormal heat generation, the controller 8 stops power supply from the alternating-current power source 13 to the feeder cable 2. That is, the controller 8 can perform, as the abnormality control, a warning control to control the notification section 14 to output a warning, and a stop control to control the alternating-current power source 13 to stop power supply to the feeder cable 2.

Figure 6:
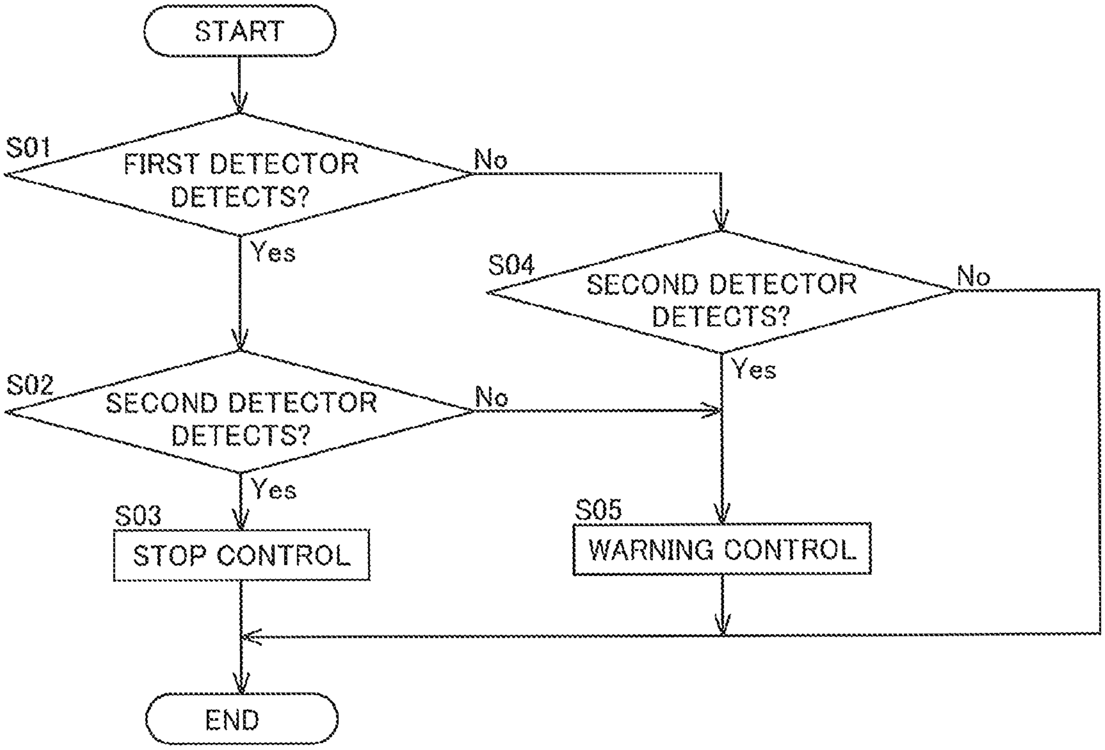
FIG. 6 is a control flow diagram.

As illustrated in FIG. 6, when the controller 8 determines that the first detector 6 detects a short-circuit in the first heat sensitive wire 31 (S01: Yes), the controller 8 determines whether or not the second detector 7 detects a short-circuit in the second heat sensitive wire 32 (S02). When the controller 8 determines that the second detector 7 detects a short-circuit in the second heat sensitive wire 32 (S02: Yes), the controller 8 performs the stop control. Hereby, the movement of the movable body 5 is also stopped. Further, when the controller 8 determines that the second detector 7 does not detect a short-circuit in the second heat sensitive wire 32 (S02: No), the controller 8 performs the warning control (S05). The warning control may be performed, for example, such that a warning is displayed on a terminal carried by an operator working in the article transport facility 200, a display device of a control computer provided in the article transport facility 200, or the like, or a buzzer or a sound is output as an alarm. Further, light may be emitted as a warning, or a display on the display device, a sound, light, and so on may be output in combination.

When the controller 8 determines that the first detector 6 does not detect a short-circuit in the first heat sensitive wire 31 (S01: No), the controller 8 determines whether or not the second detector 7 detects a short-circuit in the second heat sensitive wire 32 (S04), and when the second detector 7 detects a short-circuit in the second heat sensitive wire 32 (S04: Yes), the controller 8 performs the warning control. Note that, differently from the example illustrated in FIG. 6, before the determination on whether or not the first detector 6 detects a short-circuit in the first heat sensitive wire 31, the controller 8 may determine whether or not the second detector 7 detects a short-circuit in the second heat sensitive wire 32, or the controller 8 may perform these two determinations at the same time.

Other Embodiments

Next will be described other embodiments of the power supply facility.

(1) The above embodiment has described, as an example, the configuration in which the heat sensitive unit 3 (the first heat sensitive wire 31, the second heat sensitive wire 32) is disposed throughout the feeder cable 2, as illustrated in FIG. 1, but the present invention is not limited to this. For example, the heat sensitive unit 3 may be disposed in a region as part of the feeder cable 2. Further, in a case where a plurality of feeder cables 2 is electrically connected to each other via the terminal block 10, the heat sensitive unit 3 may be disposed throughout the plurality of feeder cables 2 connected to each other, or the heat sensitive unit 3 may be disposed only in a specific region including the terminal block 10. Thus, the range to dispose the heat sensitive unit 3 can be changed appropriately.

Figure 7:
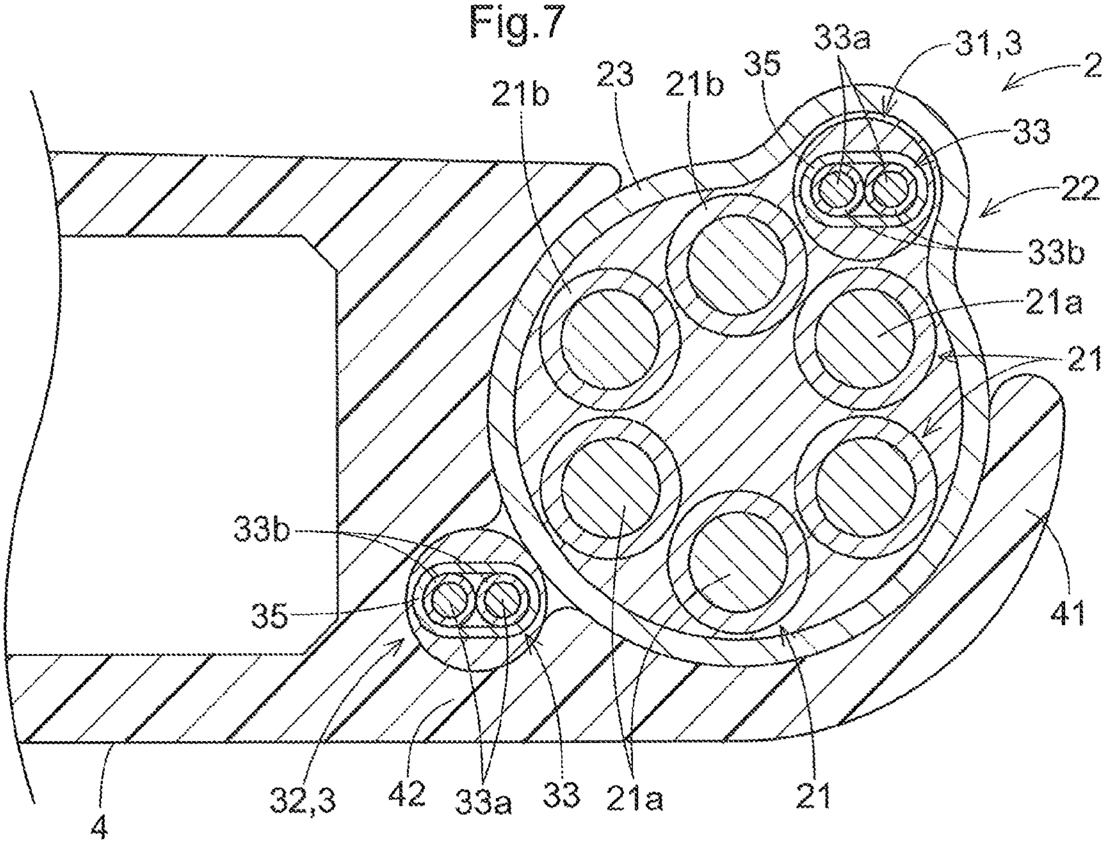
FIG. 7 is a sectional view of a support member, a feeder cable, and a heat sensitive unit in an alternative embodiment.
Figure 8:
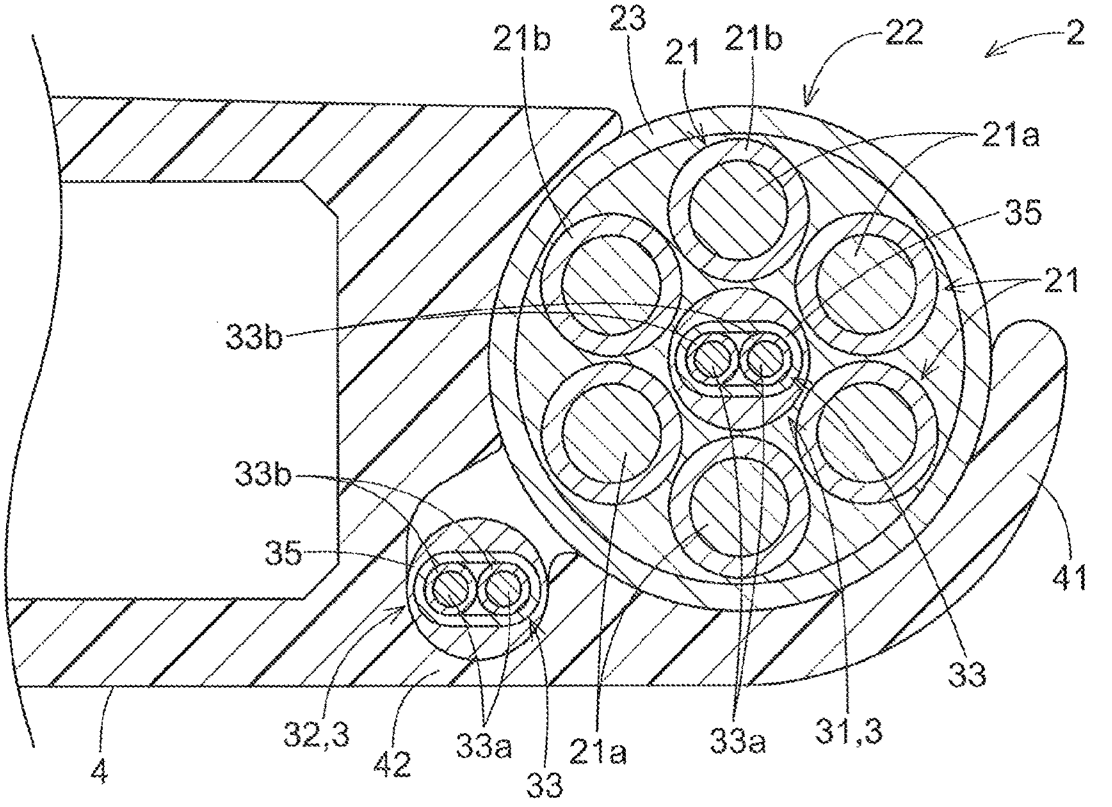
FIG. 8 is a sectional view of a support member, a feeder cable, and a heat sensitive unit in an alternative embodiment.

(2) The above embodiment has described, as an example, the configuration in which the first heat sensitive wire 31 is disposed in the central part, of the feeder cable 2, that is surrounded by the conductor bundle 22, and the second heat sensitive wire 32 is disposed in contact with the insulating coating 23 of the feeder cable 2, but the present invention is not limited to this. The position of the first heat sensitive wire 31 in the feeder cable 2 can be changed appropriately. Such an example is illustrated in FIG. 7. In the example of FIG. 7, the first heat sensitive wire 31 is disposed in contact with the insulating coating 23 of the feeder cable 2 from inside the feeder cable 2. In the example illustrated herein, the first heat sensitive wire 31 is disposed between the conductor bundle 22 and the insulating coating 23. In such a case, it is preferable that the first heat sensitive wire 31 be disposed as far as possible from the second heat sensitive wire 32. Further, the position of the second heat sensitive wire 32 can be also changed appropriately. Such an example is illustrated in FIG. 8. In the example in FIG. 8, the second heat sensitive wire 32 is disposed away from the insulating coating 23 of the feeder cable 2 without making contact with the insulating coating 23. The recessed groove shape of the second holder 42 of the support member 4 can be also changed to correspond to the position of the second heat sensitive wire 32.

(3) The above embodiment has described, as an example, the configuration in which the second heat sensitive wire 32 is disposed in the second holder 42, and then, the feeder cable 2 is disposed in the first holder 41, so that the second heat sensitive wire 32 is held by the second holder 42 so as not to fall off therefrom. However, the present invention is not limited to this. For example, a support member provided with the first holder 41 holding the feeder cable 2 and a support member provided with the second holder 42 holding the second heat sensitive wire 32 can be provided separately.

(4) The above embodiment has described, as an example, the configuration in which the first holder 41 is formed in a recessed groove shape within which the feeder cable 2 is fitted, and the second holder 42 is formed in a recessed groove shape in which the second heat sensitive wire 32 is contained. However, the present invention is not limited to such an example, and it is preferable that respective shapes of the first holder 41 and the second holder 42 be changeable appropriately.

(5) The above embodiment has described, as an example, the configuration in which, in response to either of the first detector 6 and the second detector 7 detecting abnormal heat generation, the controller 8 outputs a warning, and in response to the first detector 6 and the second detector 7 both detecting abnormal heat generation, the controller 8 stops power supply from the alternating-current power source 13 to the feeder cable 2. However, the present invention is not limited to this. For example, in a case where either of the first detector 6 and the second detector 7 detects abnormal heat generation, the controller 8 can perform a control to stop power supply from the alternating-current power source 13 to the feeder cable 2. Further, for example, in a case where at least the first detector 6 out of the first detector 6 and the second detector 7 detects abnormal heat generation, the controller 8 may stop power supply from the alternating-current power source 13 to the feeder cable 2, and in a case where only the second detector 7 out of the first detector 6 and the second detector 7 detects abnormal heat generation, the controller 8 may output a warning.

Figure 9:
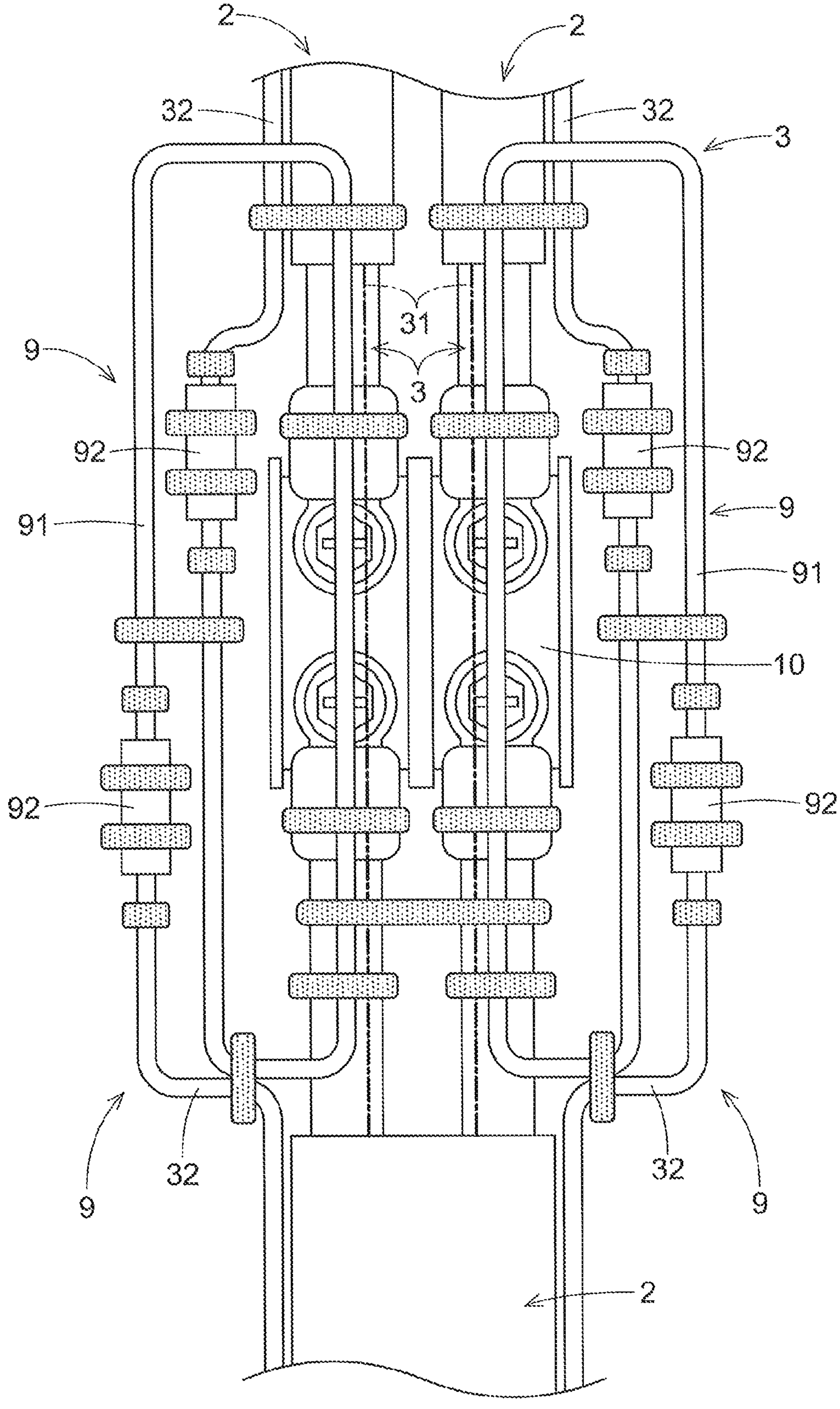
FIG. 9 is a plan view schematically illustrating a terminal block and a terminal block corresponding part in an alternative embodiment.

(6) The above embodiment has described, as an example, the configuration in which the power supply facility 1 includes the terminal block corresponding part 91 in which the target heat sensitive wire 9 as the first heat sensitive wire 31 is disposed in contact with the terminal block 10. However, the present invention is not limited to this. The second heat sensitive wire 32 may be the terminal block corresponding part 91, and the second heat sensitive wire 32 may include the target heat sensitive wire 9. Such an example is illustrated in FIG. 9. As illustrated in FIG. 9, the terminal block corresponding part 91 of the second heat sensitive wire 32 is formed independently to correspond to one terminal block 10. The terminal block corresponding part 91 is detachably connected, via the connector 92, to a part of the second heat sensitive wire 32 which part is disposed along the insulating coating 23 of the feeder cable 2 outside the insulating coating 23. The terminal block corresponding part 91 has the same structure as the second heat sensitive wire 32. In this example, a plurality of (herein, two) terminal block corresponding parts 91 is disposed along a metal part of the terminal block 10 and its surroundings. In the example illustrated herein, two second heat sensitive wires 32 are disposed on each side of the terminal block 10. Each terminal block corresponding part 91 connects the second heat sensitive wires 32 facing each other across the terminal block 10 to each other (that is, the second heat sensitive wires 32 disposed along the feeder cable 2). The terminal block 10 is connected to the second heat sensitive wires 32 via respective connectors 92. Note that the first heat sensitive wires 31 contained in the feeder cables 2 facing each other across the terminal block 10 are electrically connected to each other by another first heat sensitive wire 31 for connection via a connector or the like, for example. FIG. 9 schematically illustrates the first heat sensitive wires 31 facing each other across the terminal block 10 and electrically connected to each other, at a position that does not overlap with the terminal block corresponding part 91 in the figure (an alternate long and short dash line in FIG. 9).

(7) Note that the configuration disclosed in the above embodiment can be applied in combination with the configurations disclosed in other embodiments (including combinations of the embodiments described as other embodiments) as long as no inconsistency occurs. In terms of other configurations, the embodiment disclosed in the present specification is also just an example in all respects. Accordingly, various modifications can be made appropriately as far as it does not deviate from the scope of this disclosure.

Overview of Embodiment

The following describes the overview of the power supply facility described above.

A power supply facility according to this disclosure is a power supply facility including: at least one feeder cable disposed along a moving path of a movable body and configured to contactlessly supply electric power to the movable body; and a heat sensitive unit disposed along the moving path together with the at least one feeder cable. The at least one feeder cable includes a conductor bundle bundling up a plurality of conductor lines through which an alternating-current flows, and an insulating coating covering the conductor bundle. The heat sensitive unit includes: a first heat sensitive wire contained inside the insulating coating of the at least one feeder cable and extending along an extending direction of the at least one feeder cable together with the conductor bundle; and a second heat sensitive wire disposed at a position next to the at least one feeder cable and extending along the extending direction of the at least one feeder cable together with the at least one feeder cable.

With this configuration, in a case where the first heat sensitive wire detects abnormal heat generation, and the second heat sensitive wire detects no abnormal heat generation, it can be estimated that a problem is more likely to occur inside the feeder cable, and in a case where the second heat sensitive wire detects abnormal heat generation, and the first heat sensitive wire detects no abnormal heat generation, it can be estimated that a problem is more likely to occur outside the feeder cable. Further, in a case where both the first heat sensitive wire and the second heat sensitive wire detect abnormal heat generation, it can be estimated that a relatively large problem is more likely to occur in or around the feeder cable. As such, with this configuration, by referring to detection results from the first heat sensitive wire and the second heat sensitive wire, a place where a problem occurs in or around the feeder cable can be easily quickly specified.

Here, it is preferable that the first heat sensitive wire be disposed in a central part of the at least one feeder cable, the central part being surrounded by the conductor bundle, and the second heat sensitive wire be disposed in contact with the insulating coating of the at least one feeder cable.

With this configuration, it is possible to appropriately detect abnormal heat generation inside the feeder cable by the first heat sensitive wire, and it is possible to appropriately detect abnormal heat generation on the surface of the feeder cable by the second heat sensitive wire.

Accordingly, it is possible to easily detect the occurrence of a problem inside and around the feeder cable appropriately.

Further, it is preferable that: the power supply facility further include a support member disposed along the moving path and supporting the at least one feeder cable and the second heat sensitive wire; the support member include a first holder holding the at least one feeder cable, and a second holder holding the second heat sensitive wire; and disposing the at least one feeder cable in the first holder with the second heat sensitive wire in the second holder prevents the second heat sensitive wire from failing from the second holder.

In this configuration, the second heat sensitive wire is disposed in the second holder of the support member, and after that, the feeder cable is disposed in the first holder, so that the second heat sensitive wire can be held. This makes it possible to easily simplify an operation to dispose the feeder cable and the second heat sensitive wire.

Further, it is preferable that: the first holder have a recessed groove shape within which the at least one feeder cable is fitted; and the second holder have a recessed groove shape in which the second heat sensitive wire is contained, such that the second holder is opened on an inner surface of the first holder.

In this configuration, the second heat sensitive wire is put in the second holder of the support member, and after that, the feeder cable is fitted within the first holder, so that the feeder cable and the second heat sensitive wire can be held by the support member. This makes it possible to further easily simplify the operation to dispose the feeder cable and the second heat sensitive wire.

Further, it is preferable that: the power supply facility include a first detector configured to detect abnormal heat generation from the first heat sensitive wire, a second detector configured to detect abnormal heat generation from the second heat sensitive wire, and a controller configured to control an alternating-current power source for supplying electric power to the at least one feeder cable; and in response to either of the first detector and the second detector detecting abnormal heat generation, the controller output a warning, and in response to the first detector and the second detector both detecting abnormal heat generation, the controller stop power supply from the alternating-current power source to the at least one feeder cable.

With this configuration, it is possible to output a warning before a large problem occurs in or around the feeder cable. This makes it possible to take some kind of measures before a large problem really occurs.

In the meantime, in a case where the first detector and the second detector both detect abnormal heat generation, a relatively large problem is more likely to occur in or around the feeder cable, so that the controller stops power supply from the alternating-current power source to the feeder cable. This makes it possible to reduce the possibility that the feeder cable or its surroundings are damaged.

Further, in a case where either of the first detector and the second detector detects abnormal heat generation, it is possible to output a warning and then continue power supply to the feeder cable without stopping the power supply. In comparison with a configuration in which power supply to the feeder cable is stopped when at least either of the first detector and the second detector detects abnormal heat generation, it is possible to easily reduce the influence on the operation efficiency of the whole facility.

Further, it is preferable that: the at least one feeder cable include a plurality of feeder cables electrically connected to each other via a terminal block; at least one of the first heat sensitive wire and the second heat sensitive wire be a target heat sensitive wire including a terminal block corresponding part disposed in contact with the terminal block, and the terminal block corresponding part be detachably connected, via a connector, to a part of the target heat sensitive wire which part is along the insulating coating of the at least one feeder cable.

Generally, a terminal block part is more likely to cause abnormal heat generation in comparison with other parts of the feeder cable.

Further, a general heat sensitive wire often requires replacement after abnormal heat generation is detected.

In the above configuration, even when abnormal heat generation occurs in such a terminal block part, only a corresponding part of the heat sensitive wire can be changed easily. Therefore, in comparison with a case where a heat sensitive wire is replaced over the whole arrangement range of the feeder cable, it is possible to save time and cost for replacement.

The power supply facility according to this disclosure should be able to achieve at least one of the above effects.

What is claimed is:

1. A power supply facility comprising:

at least one feeder cable disposed along a moving path of a movable body and configured to contactlessly supply electric power to the movable body; and a heat sensitive unit disposed along the moving path together with the at least one feeder cable, and wherein:

the at least one feeder cable comprises:

a conductor bundle bundling up a plurality of conductor lines through which an alternating-current flows; and an insulating coating covering the conductor bundle, the heat sensitive unit comprises:

a first heat sensitive wire contained inside the insulating coating of the at least one feeder cable and extending along an extending direction of the at least one feeder cable together with the conductor bundle; and a second heat sensitive wire disposed at a position next to the at least one feeder cable and extending along the extending direction of the at least one feeder cable together with the at least one feeder cable, and the power supply facility further comprises:

a first detector configured to detect abnormal heat generation from the first heat sensitive wire;

a second detector configured to detect abnormal heat generation from the second heat sensitive wire; and a controller configured to control an alternating-current power source for supplying electric power to the at least one feeder cable, and wherein in response to either of the first detector and the second detector detecting abnormal heat generation, the controller outputs a warning, and in response to the first detector and the second detector both detecting abnormal heat generation, the controller stops power supply from the alternating-current power source to the at least one feeder cable.

2. The power supply facility according to claim 1, wherein:

the first heat sensitive wire is disposed in a central part of the at least one feeder cable, the central part being surrounded by the conductor bundle, and the second heat sensitive wire is disposed in contact with the insulating coating of the at least one feeder cable.

3. The power supply facility according to claim 1, further comprising:

a support member disposed along the moving path and supporting the at least one feeder cable and the second heat sensitive wire, wherein the support member comprises:

a first holder holding the at least one feeder cable; and a second holder holding the second heat sensitive wire, and wherein disposing the at least one feeder cable in the first holder with the second heat sensitive wire in the second holder prevents the second heat sensitive wire from falling from the second holder.

4. The power supply facility according to claim 3, wherein:

the first holder has a recessed groove shape within which the at least one feeder cable is fitted, and the second holder has a recessed groove shape in which the second heat sensitive wire is contained, such that the second holder is opened on an inner surface of the first holder.

5. The power supply facility according to claim 1, wherein:

in response to either of the first detector and the second detector detecting abnormal heat generation, the controller does not stop the supply of power from the power supply to the at least on feeder cable.

6. The power supply facility according to claim 1, wherein:

the movable body comprises a power reception device configured to receive driving electric power from the at least one feeder cable, a pair of the feeder cables each disposed on each side of the power reception device in a path width direction along a horizontal surface and perpendicular to a direction along the moving path, and a pair of the second heat sensitive wires are disposed outwardly in the path width direction from the pair of feeder cables.

7. A power supply facility comprising:

at least one feeder cable disposed along a moving path of a movable body and configured to contactlessly supply electric power to the movable body; and a heat sensitive unit disposed along the moving path together with the at least one feeder cable, and wherein:

the at least one feeder cable comprises:

a conductor bundle bundling up a plurality of conductor lines through which an alternating-current flows; and an insulating coating covering the conductor bundle, the heat sensitive unit comprises:

a first heat sensitive wire contained inside the insulating coating of the at least one feeder cable and extending along an extending direction of the at least one feeder cable together with the conductor bundle; and a second heat sensitive wire disposed at a position next to the at least one feeder cable and extending along the extending direction of the at least one feeder cable together with the at least one feeder cable, the at least one feeder cable comprises a plurality of feeder cables electrically connected to each other via a terminal block, at least one of the first heat sensitive wire and the second heat sensitive wire is a target heat sensitive wire including a terminal block corresponding part disposed in contact with the terminal block, and the terminal block corresponding part is detachably connected, via a connector, to a part of the target heat sensitive wire which part is along the insulating coating of the at least one feeder cable.

* * * * *